United States Patent [19]

Schmitz

[11] 4,272,876
[45] Jun. 16, 1981

[54] METHOD OF REPAIRING ONE-WAY CLUTCH DRIVE ASSEMBLIES

[76] Inventor: Vincent O. Schmitz, R.R. 1, Clear Lake, Iowa 50428

[21] Appl. No.: 937,403

[22] Filed: Aug. 28, 1978

[51] Int. Cl.³ .............................................. B23P 7/00
[52] U.S. Cl. .................................. 29/402.06; 279/29; 29/402.08
[58] Field of Search ............ 29/401 B, 401 D, 401 F, 29/401, 402.08, 402.06; 279/28, 29, 30, 33

[56] References Cited

U.S. PATENT DOCUMENTS 3,365,783   1/1968   Foster .............................. 29/148.4 A Primary Examiner—Milton S. Mehr
Assistant Examiner—V. K. Rising
Attorney, Agent, or Firm—Zarley, McKee, Thomte, Voorhees & Seese

[57] ABSTRACT

A one-way clutch having radially movable sprags is utilized to repair a drive assembly including a carrier which drives an output gear through the one-way clutch with the worn surfaces on the carrier and the gear being ground down a total of 0.006 inches with the sprags adapting to the resulting spacing by appropriate radial movement.

5 Claims, 10 Drawing Figures

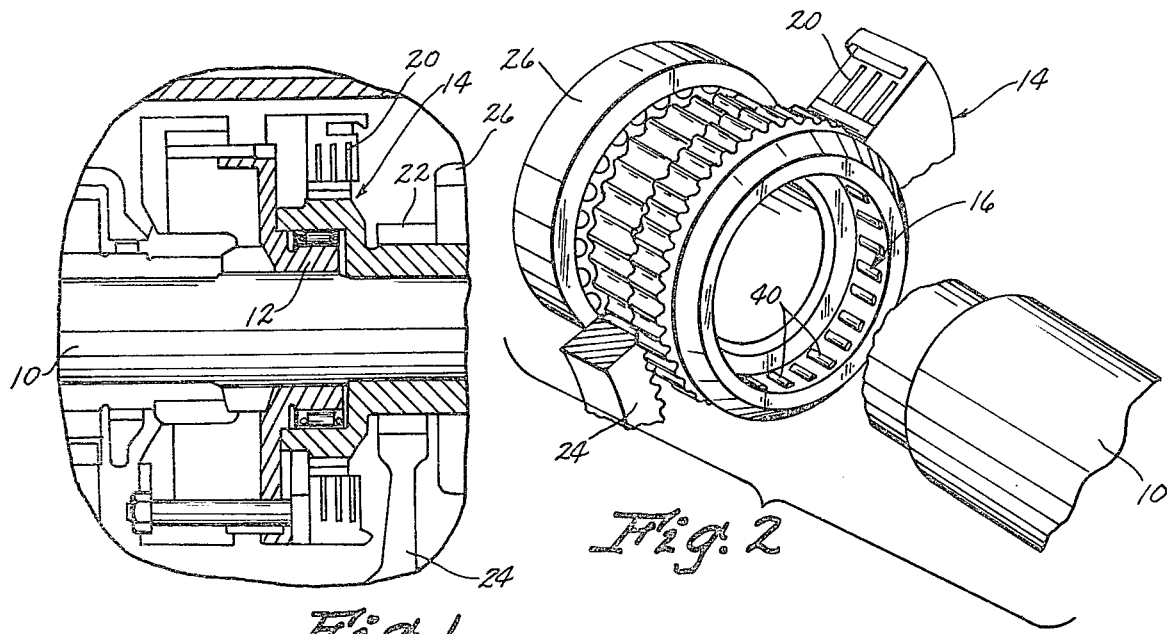
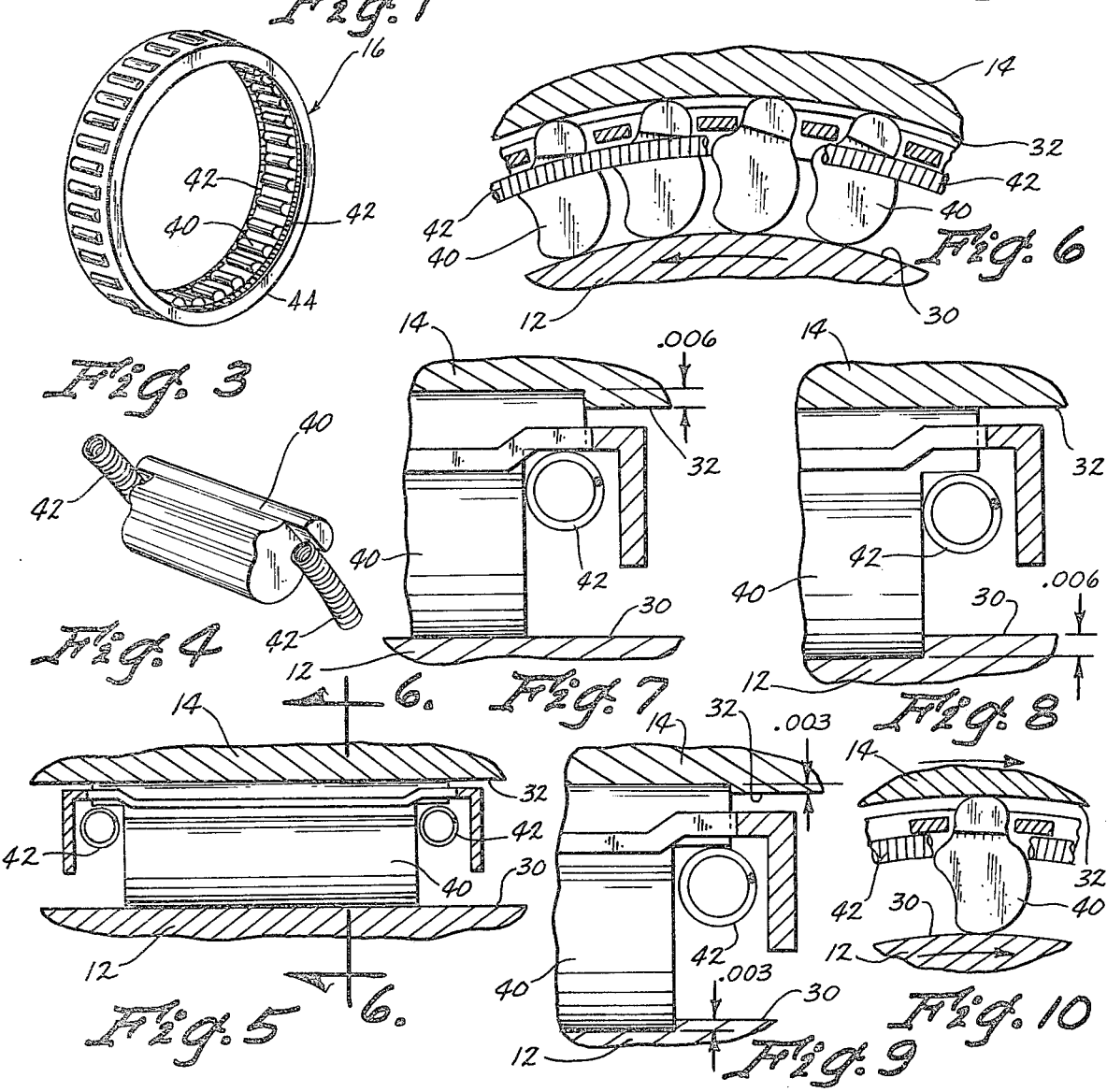

METHOD OF REPAIRING ONE-WAY CLUTCH DRIVE ASSEMBLIES

BACKGROUND OF THE INVENTION

The International Harvester hydrostatic tractors have one-way clutch drive assemblies which after a period of usage will wear on the drive and driven surfaces. The conventional repair procedure is one of two alternatives. The first common practice is to replace three parts which includes the drive part, the one-way clutch, and the driven part. The second alternative is to merely replace the worn one-way clutch. The first alternative is unsatisfactory since it involves a substantial cost for the new parts that are required and the second procedure is also unsatisfactory for the reason that the same size clutch will not satisfactorily adapt to the enlarged spacing between the drive and driven parts. Repair of this hydrostatic transmission does not ordinarily involve grinding down of any of the parts.

In other repair situations such as the crank shaft on an automobile engine or the cylinder heads, it is common to grind down the worn surface and then utilize a replacement part which is sufficiently larger to compensate for the material that has been ground away.

A stock of one-way clutches of different sizes is not ordinarily maintained by any original supplier or repair company and thus only the original replacement clutch from the manufacturer of the transmission is ordinarily all that is available. This clutch is not satisfactory where any wear has occurred on the drive and driven parts and if the manufacturer's conventional clutch were used it would require a different size clutch for each repair operation which would mean that a large number of different size clutches would have to be maintained by all repair shops and this would obviously be too expensive.

What is needed then is a clutch of one size that can be utilized in the repair of a one-way clutch drive assembly wherein either or both of the worn surfaces can be renewed by being ground down a specified total amount thereby providing a better than new one-way clutch drive assembly for the hydrostatic transmission.

SUMMARY OF THE INVENTION

The conventional original equipment one-way clutch in the inoperative one-way clutch drive assembly is discarded and a 0.006 inch oversize one-way clutch from Dana Corporation is substituted with a total of 0.006 inches being ground off of either the carrier or output gear with the radially movable sprags in the Dana one-way clutch adapting to the increased annular space regardless of how much is taken off each of the opposing surfaces even to the extent that the entire 0.006 inches may be taken off of one surface and none off of the other or the other surface may have the entire amount taken off of it and none on the opposing surface. This procedure eliminates the discarding of any component parts and allows for a pool to be established from which component parts may be drawn in the overhauling of the drive assembly.

The conventional dimensions for the outer race are 3.500 inches with the inner race being 2.8438 inches. This annular space is increased by 0.006 inches during the overhaul operation and a 0.006 inch oversize one-way clutch is used from the Dana Corporation and would have a 3.500 outer diameter and an inner diameter of 3.122 inches.

BRIEF DESCRIPTION OF THE DRAWINGS

FIG. 1 is a fragmentary perspective view of a torque amplifier which includes a one-way clutch drive assembly.

FIG. 2 is an exploded perspective view of the input drive shaft, drive output gear, and mount bearing.

FIG. 3 is a perspective view of the one-way clutch.

FIG. 4 is a fragmentary perspective view of the sprags on the energizing springs in the one-way clutch.

FIG. 5 is an enlarged cross-sectional view of the one-way clutch, as seen in FIG. 1.

FIG. 6 is a cross-sectional view taken along line 6—6 in FIG. 5 and illustrates the drive carrier rotating without driving the output gear.

FIG. 7 is a fragmentary cross-sectional view similar to FIG. 5 but illustrating the grinding of 0.006 inches from the outer race only on the output gear.

FIG. 8 is a fragmentary cross-sectional view similar to FIG. 5 but showing the grinding of 0.006 inches being taken from the inner race on the carrier.

FIG. 9 is an enlarged cross-sectional view similar to FIG. 5 showing the ground surfaces on both the carrier and output gear being enlarged equally 0.003 inches.

FIG. 10 is a cross-sectional view similar to that shown in FIG. 6 but showing the carrier driven clockwise and driving the output gear through the one-way clutch.

DESCRIPTION OF THE PREFERRED EMBODIMENT

The method of repairing a one-way clutch drive assembly is used on the torque amplifier structure shown in FIG. 1 which basically includes an input drive shaft 10 connected to an engine or the like (not shown) which in turn drives a carrier 12 for driving a torque amplifier drive output gear 14 through a one-way slip clutch 16. A first pair of teeth 18 on the drive output gear 14 drive a pair of driven plates 20 while teeth 22 drive a gear 24. A bearing 26 on the outer end of the drive output gear 14 is mounted in the transmission housing for supporting the shaft 10.

The torque amplifier illustrated is from the hydrostatic transmission of an International Harvester tractor Model 100, among others having torque amplifier units.

After extended usage of the transmission the one-way clutch 16 causes wear on the outer face 30 of the carrier 12 and the inner face 32 of the torque amplifier drive output gear 14. The wear from one unit to the next may vary on the surfaces 30 and 32. The present method contemplates cutting off a total of 0.006 inches total splitting the amount with 0.003 being taken off each surface as shown in FIG. 9 or a total of 0.006 as shown in FIG. 8 on the surface 12. In FIG. 7, the total 0.006 inch is taken off the surface 32.

This method is possible due to the one-way clutch drive assembly 16 utilized which has sprags 40 supported on energizing springs 42 carried in a retainer assembly 44 which are adapted to move laterally of the retainer assembly 44 which is radially of the axial center of rotation, as seen in FIGS. 7, 8 and 9, and thus the sprags adapt to the 0.006 inch increase in space between the surfaces 30 and 32 whether that increase is on one surface or the other or split between the two.

As seen in FIG. 6, when the carrier 12 is being turned counterclockwise as indicated by the arrow, the sprags 40 do not lock to the surface 32 and thus the output gear 14 is not turned, however, as seen in FIG. 10, when the carrier 12 is rotated clockwise, the sprags 40 engage the surface 32 and drive the output gear 14 in the same clockwise direction.

Thus it is seen when the torque amplifier drive output gear 14 and the carrier 12 come in for repair the worn surfaces are examined to determine which is to be ground down and it will not make any difference to the subsequent operation of the one-way clutch drive assembly how much is ground off of either surface as long as the total taken off of both surfaces equals 0.006 inches.

A supplier of carriers 12 and drive output gears 14 may be maintained and combined as desired with the new 0.006 oversize one-way clutch 16. The point is that for the first time that a transmission is overhauled a single supply of oversize one-way clutches is all that is needed to perform the first overhaul job on the one-way clutch assembly.

The conventional one-way clutch provided in original equipment for these transmissions is not similar to the one-way clutch 16 of this disclosure and thus is incapable of functioning as this clutch does. Specifically, the one-way clutch disclosed is purchased from Dana Corporation, Warren, Mich.

I claim:

1. Method of repairing a one-way clutch drive assembly including an input shaft which drives an output gear through a one-way clutch mounted in the output gear on the input shaft by substituting a one-way clutch having sprags which are adapted to move radially between inner and outer races on the input shaft and the output gear, the improved method comprising the steps of, taking an output gear and input shaft and discarding the used one-way clutch, grinding the inner and/or outer races on the input shaft and output gear a predetermined total amount, providing a supply of substitute one-way clutches having a common size which is larger than the original clutch by an amount equal to the predetermined amount ground off the inner and/or outer races, installing one of the substitute one-way clutches from the supply of clutches of a common size.

2. The method of claim 1 wherein the grinding of the predetermined amount is done entirely on the inner race of the input shaft.

3. The method of claim 1 wherein the grinding of the predetermined amount is done entirely on the outer race of the output gear.

4. The method of claim 1 wherein the grinding of the predetermined amount is equally divided between the inner race on the input shaft and the outer race on the output gear.

5. The method of claim 1 wherein the predetermined amount is 0.006 inches.

* * * * *